US005647313A

United States Patent [19]

Izumida et al.

[11] Patent Number: 5,647,313

[45] Date of Patent: Jul. 15, 1997

[54] COMBINATION OF ADJUSTING SHIM AND CAM

[75] Inventors: Hiromu Izumida; Kaoru Murabe; Takao Nishioka; Akira Yamakawa; Kenji Matsunuma, all of Itami, Japan

[73] Assignee: Sumitomo Electric Industries, Ltd., Japan

[21] Appl. No.: 327,313

[22] Filed: Oct. 21, 1994

[30] Foreign Application Priority Data

Oct. 29, 1993 [JP] Japan .................................... 5-294571

[51] Int. Cl.$^{6}$ ................................ F01L 1/16; F16H 53/06

[52] U.S. Cl. .................................... 123/90.51; 123/90.52; 123/90.6

[58] Field of Search ............................. 123/90.48, 90.51, 123/90.52, 90.6; 251/251; 74/567

[56] References Cited

U.S. PATENT DOCUMENTS

| | | | |
|---|---|---|---|
| 4,761,344 | 8/1988 | Maki et al. | 428/552 |
| 4,850,095 | 7/1989 | Akao et al. | 123/90.51 |
| 5,013,611 | 5/1991 | Suzuki et al. | 428/552 |
| 5,323,742 | 6/1994 | Hamada | 123/90.51 |
| 5,372,099 | 12/1994 | Matsunuma et al. | 123/90.51 |

FOREIGN PATENT DOCUMENTS

| | | |
|---|---|---|
| 208554 | 1/1987 | European Pat. Off. . |
| 296291 | 12/1988 | European Pat. Off. . |
| 523691 | 1/1993 | European Pat. Off. . |
| 136449 | 8/1984 | Japan . |
| 124581 | 6/1986 | Japan . |
| 166980 | 7/1986 | Japan . |
| 8693 | 1/1991 | Japan . |
| 195723 | 8/1993 | Japan . |

OTHER PUBLICATIONS

Patent Abstracts of Japan, vol. 12, No. 57 (M–670) ; Feb. 20; 1988 JPA–62–203,908 ; Sep. 8; 1987.

*Primary Examiner*—Weilun Lo
*Attorney, Agent, or Firm*—Bierman, Muserlian and Lucas

[57] ABSTRACT

A combination of an adjusting shim and a cam used in a valve train in an internal combustion engine for automobiles, the adjusting shim composed of a ceramic material which sets the surface roughness of a sliding surface of the adjusting shim with respect to a cam to not more than 0.1 μm in ten-point mean roughness Rz, and which contains not less than 60 vol. % of silicon nitride or sialon, and the cam composed of cast iron a surface of which is chill hardened and then provided with a phosphate film thereon. The combination of an adjusting shim and a cam is capable of smoothing a sliding surface of the cam by the break-in of the part even if the cam is not subjected to a super-precision finishing process; preventing the seizure and abnormal abrasion of sliding surfaces; stabilizing a smoothed condition of the sliding surfaces of the cam and shim for a long period of time; and providing excellent sliding characteristics of the sliding surfaces owing to a decrease in the friction coefficient thereof.

8 Claims, 1 Drawing Sheet

COMBINATION OF ADJUSTING SHIM AND CAM

BACKGROUND OF THE INVENTION

1. Field of the Invention

The present invention relates to a combination of a cam and an adjusting shim used in a valve train in an internal combustion engine for automobiles.

2. Description of the Prior Art

In recent years, it has been strongly demanded that the fuel consumption of an automobile engine be improved by increasing the efficiency of the engine, and the reducing of a friction loss of an internal combustion engine has been studied as one of effective measures for solving this problem. It is said to be very effective to reduce the abrasion of contact surfaces of, especially, a cam and an adjusting shim in a valve train which are some of such sliding parts of an internal combustion engine, such as an automobile engine that are used under the severest conditions due to their low sliding speed and high load. The adjusting shim is a part for regulating a valve clearance, and has heretofore been formed out of a metal just as the cam.

It is generally said that a minimum clearance or a minimum thickness of an oil film between opposed sliding parts and the properties of sliding surfaces of the sliding parts have a great influence on the sliding characteristics thereof. As shown in, for example, "Hydraulic Pressure and Air Pressure" Vol. 18, No. 4, 1987, pages 247–258, and "Collection of Unprinted Theses Made Public in Scientific Lecture Meeting 924" edited by Society of Automobile Techniques, 1992, pages 85–88, an oil film parameter Λ defined by the following equation 1 is used frequently as a value representing the measure of lubrication condition.

$$\Lambda = h_{min}/\sigma = h_{min}/(R_{rms1}^2 + R_{rms2}^2)^{1/2} \quad \text{(Equation 1)}$$

wherein $h_{min}$ is a minimum clearance or a minimum thickness of an oil film between opposed sliding parts, σ is a composite surface roughness of opposed sliding parts, $R_{rms1}$ is a roughness-root-mean square of a surface of one sliding part, and $R_{rms2}$ is a roughness-root-mean square of a surface of the other sliding part.

It is said that values of this oil film parameter Λ of not less than 3, not more than 1, and 1–3 indicate respectively a fluid lubrication condition, a boundary lubrication condition, and a mixed lubrication condition in which the fluid lubrication condition and boundary lubrication condition are seen in a mixed state, and that, as a value of Λ becomes large, the contact between sliding surfaces is alleviated to cause the sliding characteristics of these surfaces to be improved. Therefore, since a minimum clearance or a minimum thickness $h_{min}$ of an oil film between the sliding parts under the same sliding conditions is constant, the minimizing of the roughness of the two sliding surfaces is effective in reducing the coefficient of friction thereof.

A method of minimizing the roughness of sliding surfaces of the sliding parts by subjecting these surfaces to a highly accurate super-precision finishing process is used in practice. However, it is difficult to apply a high-precision super precision finishing process to a complicatedly shaped surface, such as a curved surface like a surface of a cam, which is a part of a valve train, and, moreover, much time and labor are required, so that the machining cost becomes very high. Accordingly, a surface finishing process consisting of a regular grinding process is mainly used, and, therefore, the reducing of a coefficient of friction between a cam and a shim cannot be done satisfactorily at present.

In the meantime, a method of reducing a friction loss by smoothing rough surfaces of a cam and an adjusting shim has been proposed, in which the cam and adjusting shim are slidingly moved for this purpose without subjecting these parts to a high-precision super precision process. According to Japanese Patent Application Laid-Open No. 5-195723, increasing residual austenite on the sliding surface of an adjusting shim and forming a phosphate film on the surface of chill hardened cast iron of a cam cause the cam to polish and smooth the adjusting shim, and the cam surface which has been embrittled to be also broken and smoothed, so that the smoothing of the sliding surfaces progresses to enable a friction loss to decrease.

The inventors of the present invention also proposed the techniques for obtaining smooth sliding movements of an adjusting shim and a cam by employing a ceramic material for the production of the adjusting shim, and setting a ten-point mean roughness Rz of the sliding surface thereof to not more than 2.0 μm (refer to Japanese Patent Application No. 3-179511, corresponding to U.S. Pat. No. 5,372,099), and the techniques for smoothing sliding surfaces during an initial period of an operation thereof by etching the sliding surface of an adjusting shim so as to embrittle the same, and thereby making the fine particles coming off from the embrittled surface polish a cam surface (refer to Japanese Patent Application No. 5-54962).

However, in the above-mentioned sliding surface smoothing techniques which utilize the sliding movements of a cam and an adjusting shim, the sliding surfaces are polished by the fine particles alone coming off due to the embrittlement and abrasion thereof. Therefore, there is a limit to the smoothing of these sliding surfaces, and, especially, it is impossible to maintain the surface roughness, the reduction of which is considered effective in reducing a friction loss, of the adjusting shim in a satisfactory stable specular condition (for example, a ten-point mean roughness Rz of not more than 0.1 μm) for a long period of time.

SUMMARY OF THE INVENTION

In view of these facts concerning the conventional techniques, an object of the present invention is to provide a combination of an adjusting shim and a cam used in a valve train in an internal combustion engine for automobiles, capable of smoothing a sliding surface of the cam by initial break-in of an engine even if the cam of a complicated shape is not subjected to a special, difficult, expensive super-precision finishing process; preventing the seizure and abnormal abrasion, which give rise to problems in the sliding of metal parts, of the sliding surfaces; obtaining a smoothed condition of the sliding surfaces stably for a long period of time; and obtaining excellent sliding characteristics of the sliding surfaces owing to a decrease in the friction coefficient thereof.

A combination of an adjusting shim and a cam used in a valve train in an internal combustion engine for automobiles which the present invention provides so as to achieve this object is characterized in that the adjusting shim consists of a ceramic material which sets a sliding surface of the adjusting shim with respect to the cam to a ten-point mean roughness Rz of not more than 0.1 μm, and which contains not less than 60 vol. % of silicon nitride or sialon, the cam consisting of cast iron a surface of which is chill hardened and then provided with a phosphate film thereon.

The "ten-point mean roughness Rz" used in the present specification is specified in JIS (Japanese Industrial Standards) B 0601.

DETAILED DESCRIPTION OF THE PREFERRED EMBODIMENTS

Figure 1:
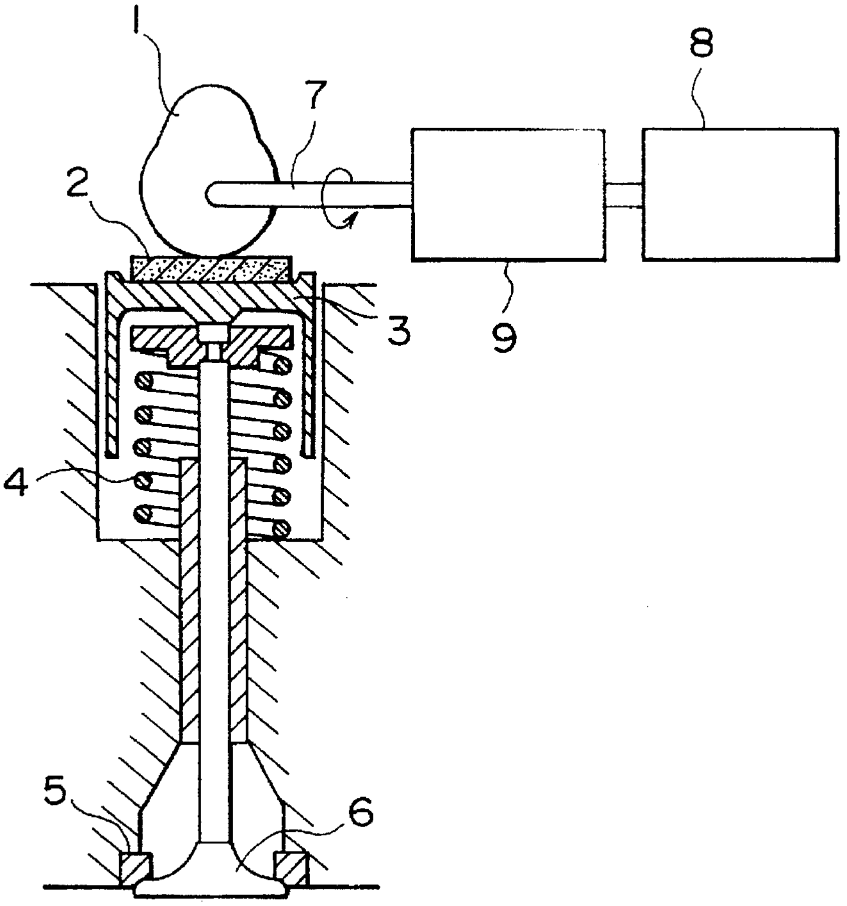
FIG. 1 is a schematic section of a cam shaft driving torque measuring testing machine which is used in Examples, and which uses a direct acting valve train for an internal combustion engine for automobiles.

In accordance with the present invention, the ceramic material used for the adjusting shim of the present invention may be a monolithic ceramic sintered body, or a composite ceramic material in which a matrix is compounded and reinforced with one of fiber, whiskers and dispersed particles, as long as it contains not less than 60 vol. % of silicon nitride ($Si_3N_4$) or sialon.

The composite ceramic material may consist of a fiber-reinforced composite material obtained by reinforcing $Si_3N_4$ or sialon with carbon fiber, silicon carbide fiber, alumina fiber or the like; a whisker-reinforced composite material obtained by reinforcing $Si_3N_4$ or sialon with silicon carbide whiskers or the like; or a particle-dispersed reinforced composite material obtained by reinforcing $Si_3N_4$ or sialon with particles, such as titanium nitride particles or silicon carbide particles of the order of nanometer.

The adjusting shim requires excellent abrasion resistance and strength and high hardness and durability so as to maintain a low-torque, long-life stable sliding condition. In order to meet this requirement, it is preferable that a theoretical density ratio of the ceramic material constituting the adjusting shim be not less than 95% with an average particle size of a matrix not more than 10 μm. It is preferable that the content of silicon nitride or sialon of the ceramic material be not less than 75 vol. %, and that the content of the same substance of the composite ceramic material be in the range of 75–90 vol. %.

A material for the cam to be combined with the adjusting shim is generally used cast iron the surface of which is chill hardened, and then provided thereon in the present invention with a phosphate. The phosphate films include various types of films, such as a zinc phosphate film, an iron zinc phosphate film, a calcium zinc phosphate film and a manganese phosphate film but a manganese phosphate film is preferable when consideration is given to the abrasion resistance, hardness, etc., of such a film. The methods of forming a phosphate film include a method in which a cam is immersed in a chemical liquid consisting of metal ions of a suitable concentration and phosphoric acid so as to form a phosphate film on the surface of the cam.

When a value of the oil film parameter Λ in the equation 1 mentioned above becomes less than 3 in a ceramic adjusting shim, a member slidingly moved in a lubricant with a cam, an opposed metal member, the sliding member and opposed member start contacting each other at the free ends of projections on their sliding surfaces, and the contact portions cease to be in a fluid lubrication condition and are put in a boundary lubrication condition, the overall lubrication condition becoming a mixed lubrication condition in which a fluid lubrication condition and a boundary lubrication condition are seen in a mixed state. With an increase of area of the boundary lubrication portion, a coefficient of friction between the cam and adjusting shim suddenly increases.

According to the present invention, excellent abrasion resistance and seizure preventing effect can be obtained owing to the synergetic effect of the properties of the phosphate film formed on the surface of the cam and the very smoothly surfaced ceramic material of a ten-point mean roughness Rz of not more than 0.1 μm constituting the adjusting shim, and, since a smoothed condition of the sliding surfaces can be attained as will be described below, the area of a portion in a boundary lubrication condition decreases, so that a loss of friction between the cam and shim is reduced more than that in conventional techniques. Therefore, excellent sliding characteristics can be obtained stably for a long period of time.

Especially, when the high contact surface pressure of the adjusting shim with respect to the cam and the offensiveness (appearing as abnormal abrasion of the cam) of the adjusting shim during a sliding movement thereof against the cam surface due to the unevenness of the shim surface are taken into consideration, it is necessary that the surface roughness of the adjusting shim be not more than 0.1 μm in ten-point mean roughness Rz from an initial period of operation thereof, and that this surface roughness be maintained stably for a long period of time.

In the adjusting shim consisting of a ceramic material according to the present invention, the surface roughness is set to not more than 0.1 μm in ten-point mean roughness Rz by mirror-finishing, and the surface roughness in this range can be maintained for a long period of time owing to the high hardness and abrasion resistance of the ceramic material. Although it is more preferable that the adjusting shim has a lower surface roughness, setting the surface roughness thereof to not higher than 0.01 μm in Rz is practically meaningless, and also difficult in view of the manufacturing cost. It can be said that maintaining for a long period of time the surface roughness of not higher than 0.01 μm in Rz of even a ceramic material of a high hardness is difficult under the severe sliding conditions of an adjusting shim or the like.

In a lubrication region in which a value of an oil film parameter Λ is small, a friction coefficient value in an oil-free sliding movement of sliding members which is determined on the basis of the material of the sliding members is a dominant factor of an overall friction loss. In the adjusting shim according to the present invention, a friction coefficient is reduced greatly by using a ceramic material. Moreover, owing to the use of a ceramic material, an abrasion resistance ascribed to the high hardness of the ceramic material and a seizure preventing effect ascribed to the low degree of surface activity thereof are obtained, and the reduction of the weight of a valve train as a whole can be attained since the ceramic material is comparatively lighter than steel.

In the combination of an adjusting shim and a cam according to the present invention, the phosphate film formed on the cam comes off and falls due to a sliding movement thereof. The dropped phosphate particles existing between the sliding surfaces of the cam and shim polish the cam of a lower hardness selectively and improve the surface roughness thereof. Consequently, the surface of the cam is polished naturally during the break-in thereof or an initial period of sliding thereof with the adjusting shim, even when the cam is not subjected to a precision finishing process, and this enables the surface roughness of the cam to be improved, and the friction coefficient thereof to be reduced.

When the sliding surface of the cam is polished and smoothed during the break-in or an initial period of a sliding movement thereof with the adjusting shim continuing to maintain its excellent specular condition owing to the abrasion resistance and seizure preventing effect of the ceramic material, the area of a portion, which is in a fluid lubrication condition, of the cam in a mixed lubrication condition increases. Accordingly, the progress of abnormal abrasion and partial abrasion of the sliding surfaces stops and the surface accuracy of the cam and adjusting shim is maintained stably. At the same time, an excellent lubrication condition can be maintained for a long period of time.

EXAMPLE 1

As shown in FIG. 1, a cam shaft driving torque measuring testing machine was made by installing a motor 8 for driving a cam shaft 7, an oil supply pump and a torque meter 9 for measuring the driving torque of the cam shaft 7 in a valve train of a 4-cylinder 16-valve engine for a commercially available automobile having an outer shim type direct-acting type valve train with a displacement of 1800 cc. In the valve train, a valve lifter 3 is driven by the operations of a cam 1 and a valve spring 4 to open and close a suction and exhaust valve 6. Referring to FIG. 1, a reference numeral 2 denotes an adjusting shim, and 5 a valve seat.

The combinations of the cams and shims shown in Table 1 were used as the cam and adjusting shim for the valve train described above. The cams (shown with the words "film-coated" in Table 1) according to the present invention used consisted of cams obtained by chill hardening the surface of ordinary cast iron with a chiller, and forming a manganese phosphate film on the resultant surface by a lubrite process. The conventional cams (shown with the words "conventional product" in Table 1) consisted of cams obtained by chill hardening the surface of ordinary cast iron.

The adjusting shims 2 used consisted of one of a sintered body (shown as "$Si_3N_4$ sintered body 1" or "Sialon sintered body 1" in Table 1) composed of 80 vol. % of $Si_3N_4$ or sialon and a grain boundary phase containing glass as a main component for the remaining part of the sintered body; a sintered body (shown as "$Si_3N_4$ sintered body 2" in Table 1) composed of 50 vol. % of $Si_3N_4$ and a grain boundary phase containing glass as a main component for the remaining part of the sintered body; a composite material (shown as "Composite material 1" in Table 1) composed of 80 vol. % of $Si_3N_4$—5 vol. % of SiC and a grain boundary phase containing glass as a main component for the remaining part of the composite material; and a composite material (shown as "Composite material 2" in Table 1) composed of 50 vol. % of $Si_3N_4$—30 vol. % of SiC and a grain boundary phase containing glass as a main component for the remaining part of the composite material, these adjusting shims having various surface roughnesses (ten-point mean roughnesses Rz).

The conventional adjusting shims used consisted of an adjusting shim (shown as "Conventional product 1" in Table 1) composed of Cr—Mo steel the surface roughness of which was equal to that of a genuine part of an engine for a commercially available automobile; and an adjusting shim (shown as "Conventional product 2" in Table 1) composed of silicon nitride and having an alkali etched surface.

These cams and adjusting shims which were in a brand-new state, i.e., which were not yet subjected to break-in, were set on the above-mentioned cam shaft driving torque measuring testing machine, and the testing machine was operated practically at 1500 rpm in terms of revolution number of a crankshaft. The cam shaft driving torque was measured one hour and 100 hours after the starting of the operation of the testing machine, and the results were shown in Table 1. The ten-point mean roughness Rz of the sliding surfaces of the adjusting shims was measured before the test starting time and after the lapse of 100 hours counted from the test starting time, and the results were also shown in Table 1.

TABLE 1

| | | | Surface roughness Rz (μm) of shim | | Driving torque (kgf · mm²) | |
|---|---|---|---|---|---|---|
| Sample | Cam | Shim | Before to test | 100 hrs passed | 1 hr passed | 100 hrs passed |
| 1-1 | Film coated | $Si_3N_4$ sintered body 1 | 0.06 | 0.07 | 190 | 138 |
| 1-2 | Film coated | Sialon sintered body 1 | 0.08 | 0.07 | 198 | 124 |
| 1-3* | Film coated | $Si_3N_4$ sintered body 1 | 0.39 | 0.39 | 227 | 145 |
| 1-4* | Film coated | Sialon sintered body 1 | 0.35 | 0.36 | 236 | 142 |
| 1-5* | Film coated | $Si_3N_4$ sintered body 2 | 0.08 | 0.14 | 201 | 156 |
| 1-6 | Film coated | Composite material 1 | 0.07 | 0.08 | 187 | 134 |
| 1-7* | Film coated | Composite material 2 | 0.08 | 0.12 | 197 | 153 |
| 1-8* | Film coated | Conventional product 1 | 0.49 | 0.38 | 236 | 155 |
| 1-9* | Conventional product | Conventional product 2 | 0.57 | 0.39 | 277 | 151 |
| 1-10* | Conventional product | $Si_3N_4$ sintered body 1 | 0.07 | 0.07 | 229 | 172 |
| 1-11* | Conventional product | Conventional product 1 | 0.55 | 0.61 | 231 | 168 |

(Note) The samples having a mark (*) on their numbers in the table are comparative examples.

As is clear from the results shown in Table 1, the driving torque of a cam shaft in a case where the combinations (samples 1-1, 1-2 and 1-6) of a cam and an adjusting shim according to the present invention are employed decreases to a substantially low level after 100-hour break-in of the parts has been carried out as compared with that of a cam shaft in a case where the combinations of the comparative examples are employed. Especially, when the surface roughness of the adjusting shim is not more than 0.1 μm in ten-point mean roughness Rz, the driving torque reducing effect is large, and, when Rz is larger than 0.1 μm, a decrease in the driving torque is small even if the other conditions are the same as those of the samples of the present invention.

EXAMPLE 2

After the tests on the driving torque of a cam shaft in Example I had been finished, the same samples were operated for 100 more hours under the same conditions as in Example 1 by using the same cam shaft driving torque measuring testing machine, and the variation of the driving torque of the cam shaft and the condition of the surface roughness of the adjusting shims with respect to such a long term operation of the parts were examined. To be exact, the cam shaft driving torque was measured 101 hours and 200 hours after the operation starting time in the test in Example 1, and the ten-point mean roughness Rz of the adjusting shims 100 hours after (before the starting of the test in Example 2) the starting of the test in Example 1 and 200 hours, which included the test time in Example 1, after the same test starting time, and the results of both measurement were shown in Table 2.

TABLE 2

| Sample | Cam | Shim | Surface roughness Rz (μm) of shim | | Driving torque (kgf · mm$^2$) | |
|---|---|---|---|---|---|---|
| | | | 100 hrs passed | 200 hrs passed | 101 hr passed | 200 hrs passed |
| 2-1 | Film coated | $Si_3N_4$ sintered body 1 | 0.07 | 0.08 | 138 | 136 |
| 2-2 | Film coated | Sialon sintered body 1 | 0.07 | 0.07 | 125 | 122 |
| 2-3* | Film coated | $Si_3N_4$ sintered body 1 | 0.39 | 0.38 | 144 | 143 |
| 2-4* | Film coated | Sialon sintered body 1 | 0.36 | 0.37 | 142 | 143 |
| 2-5* | Film coated | $Si_3N_4$ sintered body 2 | 0.14 | 0.28 | 157 | 163 |
| 2-6 | Film coated | Composite material 1 | 0.08 | 0.07 | 134 | 132 |
| 2-7* | Film coated | Composite material 2 | 0.12 | 0.25 | 152 | 158 |
| 2-8* | Film coated | Conventional product 1 | 0.38 | 0.48 | 158 | 163 |
| 2-9* | Conventional product | Conventional product 2 | 0.39 | 0.39 | 152 | 150 |
| 2-10* | Conventional product | $Si_3N_4$ sintered body 1 | 0.07 | 0.07 | 172 | 168 |
| 2-11* | Conventional product | Conventional product 1 | 0.61 | 0.59 | 169 | 172 |

(Note) The samples having a mark (*) on their numbers in the table are comparative examples.

It is understood from the results shown in Table 2 that the combinations (samples 2-1, 2-2 and 2-6) of a cam and an adjusting shim according to the present invention enable an effect of greatly reducing the cam shaft driving torque to be maintained for a long period of time. It is also understood that the surfaces of the adjusting shims in the inventive combinations are maintained in an initial specular condition for a long period of time.

EXAMPLE 3

Figure 2:
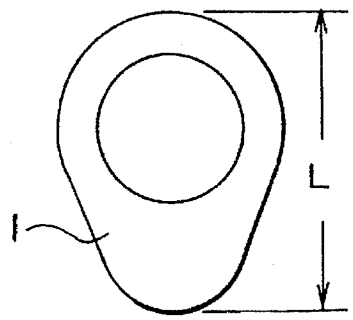
FIG. 2 is a schematic plan of a cam for describing a method of measuring an abrasion loss of a cam in Example 3.

Regarding the samples which had finished being subjected to the cam shaft driving torque test in Example 2, the ten-point mean roughness Rz of the sliding surfaces of the cams operated for a total of 200 hours through Examples 1 and 2 was measured, and cam nose length L shown in FIG. 2 was determined, an abrasion loss of each cam being determined on the basis of a difference between the resultant cam nose length and the cam nose length measured before the operation of the cam and shim had been started. The results are shown in Table 3 with the ten-point mean roughness Rz of the sliding surfaces of the cams before starting of the tests in Example 1.

TABLE 3

| Sample | Cam | Shim | Surface roughness Rz (μm) of shim Before test | Surface roughness Rz (μm) of cam Before test | Surface roughness Rz (μm) of cam 200 hrs passed | Abrasion loss (μm) |
|---|---|---|---|---|---|---|
| 2-1 | Film coated | $Si_3N_4$ sintered body 1 | 0.06 | 3.24 | 0.127 | 15 |
| 2-2 | Film coated | Sialon sintered body 1 | 0.08 | 3.14 | 0.132 | 22 |
| 2-3* | Film coated | $Si_3N_4$ sintered body 1 | 0.39 | 2.98 | 0.241 | 251 |
| 2-4* | Film coated | Sialon sintered body 1 | 0.35 | 3.07 | 0.214 | 269 |
| 2-5* | Film coated | $Si_3N_4$ sintered body 2 | 0.08 | 3.11 | 0.203 | 233 |
| 2-6 | Film coated | Composite material 1 | 0.07 | 3.09 | 0.131 | 24 |
| 2-7* | Film coated | Composite material 2 | 0.08 | 3.11 | 0.304 | 229 |
| 2-8* | Film coated | Conventional product 1 | 0.49 | 3.02 | 0.541 | 210 |
| 2-9* | Conventional product | Conventional product 2 | 0.57 | 1.92 | 0.223 | 358 |
| 2-10* | Conventional product | $Si_3N_4$ sintered body 1 | 0.07 | 1.86 | 0.715 | 21 |
| 2-11* | Conventional product | Conventional product 1 | 0.55 | 1.85 | 0.362 | 365 |

(Note) The samples having a mark (*) on their numbers in the table are comparative examples.

It is understood from the above results that the surface of a cam subjected to a lubrite process becomes rougher due to a phosphate film than that of a conventional cam, and that the surface roughness of the former surface becomes smaller than that of the latter surface after the test has been finished since the phosphate film comes off due to the sliding of the cam against the adjusting shim to cause the cam to be polished. It is also understood that, when the surface roughness Rz of the adjusting shim is set to not more than 0.1 μm, the abrasion loss of the cam, as opposed member can be reduced remarkably.

According to the combination of an adjusting shim and a cam of the present invention, the surface roughness of the cam is improved during the break-in of the parts or an initial period of an operation thereof, whereby the friction resistance of a portion which is put in a boundary lubrication condition can be reduced, the sliding characteristics of the cam and shim being improved to enable the cam shaft driving torque to be reduced greatly as compared with that of a conventional combination. Since the surface roughness of the cam can be improved during the break-in or an initial period of operation of the cam and shim, a friction loss can be reduced even when the surface of the cam, which has a complicated shape, is not subjected to a special, super precision finishing process, so that the present invention is economically very advantageous.

What is claimed is:

1. In a combination of an adjusting shim and a cam used in a valve train in an internal combustion engine for automobiles, an improvement characterized in that said adjusting shim consists of a ceramic material which sets a sliding surface of said adjusting shim with respect to said cam to a ten-point mean roughness Rz of not more than 0.1 μm, and which contains not less than 60 vol. % of silicon nitride or sialon, said cam consisting of cast iron a surface of which is chill hardened and then provided with a phosphate film thereon, the hardness of the sliding surface of the cam being lower than the surface of the shim.

2. A combination of an adjusting shim and a cam according to claim 1, wherein said ceramic material constituting said adjusting shim consists of a monolithic ceramic material, or a composite ceramic material reinforced with fiber, whiskers or dispersed particles.

3. A combination of an adjusting shim and a cam according to claim 1, wherein a theoretical density ratio of said ceramic material constituting said adjusting shim is not less than 95%, an average particle size of a matrix being not more than 10 μm.

4. A combination of an adjusting shim and a cam according to claim 2, wherein a theoretical density ratio of said ceramic material constituting said adjusting shim is not less than 95%, an average particle size of a matrix being not more than 10 μm.

5. A combination of an adjusting shim and a cam according to claim 1, wherein said phosphate film formed on the surface of said cam is a manganese phosphate film.

6. A combination of an adjusting shim and a cam according to claim 2, wherein said phosphate film formed on the surface of said cam is a manganese phosphate film.

7. A combination of an adjusting shim and a cam according to claim 3, wherein said phosphate film formed on the surface of said cam is a manganese phosphate film.

8. A combination of an adjusting shim and a cam according to claim 4, wherein said phosphate film formed on the surface of said cam is a manganese phosphate film.

* * * * *